(12) United States Patent
Depondt

(10) Patent No.: US 9,333,948 B2
(45) Date of Patent: May 10, 2016

(54) CONNECTING DEVICE FOR CONNECTING A WIPER ARM TO A WIPER BLADE IN AN ARTICULATED MANNER

(75) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 13/808,086

(22) PCT Filed: Jul. 4, 2011

(86) PCT No.: PCT/EP2011/061228
§ 371 (c)(1),
(2), (4) Date: Jan. 2, 2013

(87) PCT Pub. No.: WO2012/001175
PCT Pub. Date: Jan. 5, 2012

(65) Prior Publication Data
US 2013/0104334 A1 May 2, 2013

(30) Foreign Application Priority Data
Jul. 2, 2010 (DE) .......................... 10 2010 030 880

(51) Int. Cl.
*B60S 1/40* (2006.01)
*B60S 1/38* (2006.01)

(52) U.S. Cl.
CPC ............... *B60S 1/4003* (2013.01); *B60S 1/387* (2013.01); *B60S 1/3849* (2013.01); *B60S 1/4006* (2013.01); *B60S 1/4016* (2013.01); *B60S 1/4048* (2013.01); *B60S 1/4074* (2013.01); *B60S 1/4083* (2013.01); *B60S 1/3865* (2013.01); *B60S 2001/4022* (2013.01); *B60S 2001/4035* (2013.01); *B60S 2001/4061* (2013.01)

(58) Field of Classification Search
CPC ........ B60S 1/40; B60S 1/3849; B60S 1/3868; B60S 1/3865; B60S 1/387; B60S 1/4003; B60S 1/4048; B60S 1/4045; B60S 1/4038; B60S 1/4006; B60S 1/4074; B60S 1/4083; B60S 1/4016; B60S 2001/4022; B60S 2001/4035; B60S 2001/4061

USPC ........................................................ 15/250.32
See application file for complete search history.

(56) References Cited

U.S. PATENT DOCUMENTS

2009/0007364 A1    1/2009   Jarasson et al.

FOREIGN PATENT DOCUMENTS

| CN | 1964875 | 5/2007 |
|---|---|---|
| CN | 201201574 | 3/2009 |

(Continued)

OTHER PUBLICATIONS

International Search Report for Application No. PCT/EP2011/061228 dated Sep. 27, 2011 (2 pages).

*Primary Examiner* — Gary Graham
(74) *Attorney, Agent, or Firm* — Michael Best & Friedrich LLP

(57) ABSTRACT

The invention relates to a connecting device (10) for connecting a joining element (46, 48, 50, 52, 54, 56, 58, 60, 62, 64, 66) of a wiper arm to a wiper blade (12) in an articulated manner, the supporting element (16) of said wiper blade being rigidly connected to a connecting element (20) of the connecting device (10). The connecting element (20) has at least one mounting web (26) which runs in the longitudinal direction, protrudes into the interior of an adapter (36, 38, 40, 42, 44), and supports a mounting pin (28) that runs transversely to the longitudinal direction. The adapter (36, 38, 40, 42, 44) is pivotably mounted on said mounting pin by mounting means (88), and the adapter (36, 38, 40, 42, 44) is detachably connected to the joining element (46, 48, 50, 52, 54, 56, 58, 60, 62, 64, 66). According to the invention, the mounting web (26) is formed on one longitudinal edge of a base (22) of the connecting element (20) only in a short region on the outer end of the connecting element (20), and the mounting pin (28) is secured on the mounting web (26) in cantilevered manner towards the other longitudinal edge of the base (22), while a lateral web (30) is formed on the other longitudinal edge of the base (22) in an offset manner with respect to the inner end of the connecting element (20).

24 Claims, 10 Drawing Sheets

(56) References Cited

FOREIGN PATENT DOCUMENTS

| | | |
|---|---|---|
| CN | 201325432 | 10/2009 |
| CN | 201362240 | 12/2009 |
| DE | 10259481 A1 | 7/2004 |
| DE | 10347637 A1 | 5/2005 |
| DE | 10349637 A1 | 6/2005 |
| DE | 202005021307 U1 | 10/2007 |
| DE | 102009014700 A1 | 10/2009 |
| JP | 2007331493 A | 12/2007 |
| RU | 2293034 | 2/2007 |

CONNECTING DEVICE FOR CONNECTING A WIPER ARM TO A WIPER BLADE IN AN ARTICULATED MANNER

BACKGROUND OF THE INVENTION

The invention relates to a connecting device for connecting a wiper arm to a wiper blade in an articulated manner.

The German patent publication DE 20 2005 021 307 U1 discloses a connecting device for the articulated connection of a wiper blade of flat bar construction, said connecting device being suitable for different wiper arms. The connecting device comprises at least one single-part or multi-part connecting element which is fastened rigidly, but releasably, to a supporting element of the wiper blade in the form of spring rails. An adapter is provided between each wiper arm and wiper blade, said adapter having on the one hand connecting options for the connecting element and on the other hand connecting options for one of the wiper arms or for corresponding joining elements, which are rigidly connected to the respective wiper arm or integrally formed with said wiper arm. A joint, the joint axis of which extends transversely with respect to the longitudinal direction, is disposed between one of the joining elements and an adapter, which is connected in a rotationally fixed manner to the connecting element or alternatively between a part of the adapter connected in a rotationally fixed manner to said connecting element and a part of the adapter connected in a rotationally fixed manner to the joining element. In so doing, three different adapters result for three different joining elements of the wiper arms.

The connecting device is suitable for a wiper arm with a hook-shaped end or joining element or an end or joining element with a lateral mounting pin and a bridge corresponding to a known sidelock principle, or a wiper arm with an end or joining element, in which the wiper arm runs substantially rectilinearly above the wiper blade and is connected to the connecting element according to the toplock principle.

Another connecting device for the articulated connection of a wiper blade to a wiper arm is known from the German patent publication DE 103 47 637 A1. In this case, a connecting element in the form of a sheet-metal claw has a central longitudinal web which faces away from the supporting element of the wiper blade and into which a transversely running pivot spindle is inserted in a rotationally fixed manner. An adapter with bearing openings which are arranged in lateral spring tongues is mounted pivotably on the pivot spindle, which projects in a floating manner on both sides of the longitudinal web. The adapter, which is manufactured from plastic, surrounds the sheet-metal claw from the outside and is clipped by means of latching elements and retaining elements into a joining element, which is open toward the wiper blade and is connected rigidly to the wiper arm. The adapter is on the one hand guided laterally on the longitudinal web of the sheet-metal claw by means of inner guide webs and is on the other hand inserted at the side walls thereof in a play-free manner in the joining element. For this purpose, a push button is used, which is provided at the end of a spring tongue in a cover wall of the adapter and in the assembled state latches into a matching latching hole in a cover wall of the joining element.

SUMMARY OF THE INVENTION

According to the invention, the mounting web of the connecting element of the inventive connecting device is integrally formed on one longitudinal edge of a base of the connecting element only in a short region on the outer end of said connecting element, and the mounting pin is secured on the mounting web in a cantilevered manner towards the other edge of the base, while a lateral web is formed in a plane parallel to the mounting web on the other edge of the base in an offset manner with respect to the inner end of the connecting element. The connecting element of the inventive connecting device is advantageously configured such that said connecting element in combination with five adapters facilitates an articulated connection of the wiper blade to ten different joining elements from ten different wiper arms. A wiper blade can thereby cover a wide range of application of different wiper arms with a very small diversity of components.

For this purpose, it is expedient that the lateral web is divided by a gap running perpendicularly to the supporting element. The lateral web has further a recess in the part which is oriented towards the outer end of the wiper blade. These embodiments of the lateral web facilitate an easy fixing and a good lateral guidance of the adapter in relation to the connecting element and therefore to the wiper blade.

The articulated connection of the adapter to the connecting element takes place in the same manner in all of the embodiments, namely by virtue of the fact that a bearing bushing, which can be mounted so as to be rotatable on the mounting pin, is rigidly connected to the end of the adapter oriented towards the outer end of the wiper blade. A flap of angular cross-section, which is connected in an articulated manner to the rest of the adapter via an integral hinge running in the longitudinal direction, covers the bearing bushing and secures the same on the mounting pin in the closed state, e.g., by said flap overlapping the mounting web with the angled end thereof and latching at an edge of the adapter.

The embodiments of the five adapters differ among other things with regard to the flaps, which secure the adapter in the axial direction on the mounting pin of the connecting element. Whereas in the case of the first, fourth and fifth adapter, the flap essentially covers only the region of the mounting web and the bearing bushing; the flap of the second and third adapter extend over the entire length of the adapter.

In order to connect the first adapter to a first joining element, the base element of said adapter, at the transition of the flap to the remaining part of the base element, has an outwardly protruding abutment edge, whereat the one face edge of the first joining element can be supported if the joining element is slid with the face side thereof from the inner end of the first adapter onto the same. That end is denoted as the inside or inner end of the wiper blade or the components thereof which describes an inside pathway on a window pane of a vehicle; whereas the opposite end is denoted as the outer end. The abutment edge at the side walls of the flap advantageously has pockets, which are configured concavely in the longitudinal direction and interact accordingly with correspondingly concavely configured face edges of the first joining element. In order to prevent an undesired disassembly of the first joining element, the base element advantageously has a spring tongue comprising a push button, which protrudes outwardly with respect to the cover wall of the base element and in the assembled state of the first joining element latches into a latching hole of the joining element.

In order to connect a second joining element to the first adapter, a cover cap is placed on the said adapter, which cap has an identical configuration as the front end of the first joining element. The cover cap is fixed in the longitudinal direction between the abutment edge and the push button, which latches into a latching aperture in a cover wall of the cover cap. The cover cap fits flushly to the base element and has a bearing opening at least in one side wall, said bearing opening aligning with a bearing opening in the side wall of the base element in the assembled state of the cover cap. The second joining element is held in the bearing openings of the cover cap and the base element by a mounting pin and is fixed in the axial direction of the mounting pin by a bridge, which overlaps the cover cap in the assembled state and holds the same with an angled end; and therefore the pivoting movement between the wiper blade and the wiper arm is facilitated exclusively by the joint, which is formed by the mounting pin of the connecting element and by the bearing bushing of the first adapter.

The fourth adapter is similarly constructed as the first adapter and serves to connect the wiper blade in an articulated manner to a seventh and eighth joining element, which are similar to the first and second joining element. Whereas the first joining element is cranked so that the wiper arm runs laterally offset with respect to the wiper blade, the wiper arm of the seventh joining element runs above the wiper blade. In relation to the fourth adapter, the seventh joining element is fixed in the longitudinal direction between an abutment edge and a push button, which engages and latches in a latching hole in the cover wall of the seventh joining element. Towards the outer end and behind the push button of the base element, the base element of the fourth adapter has a depression in which a bridge of the eighth joining element engages in the assembled state; thus enabling the outer contour of the bridge to fit to a large extent flushly to the outer contour of a cover cap or the pushbutton in the assembled state, wherein the bridge extends through an opening running transversely in the cover wall of the cover cap into the depression of the base element of the fourth adapter. Said opening extends to some extent beyond the adjoining side walls of the cap so that an angled end of the bridge is stabilized at the base element of the adapter. At least on one side, the cover cap and the base element have bearing openings for a mounting pin of the eighth joining element, which align with each other.

Adapters two and three have a flap which extends across the entire length of the adapter. When the flap is open, the third and fourth joining elements can be connected to the second adapter. For this purpose, the second adapter has a profiled accommodating part which runs in the longitudinal direction and is located on the inside of the side wall thereof connected to the bearing bushing. The third joining element comprising a hook-shaped end can be slid onto the profiled accommodating part in the direction of the bearing bushing from the accessible side. After assembly of said third joining element, the flap is closed; thus enabling the third adapter to be secured on the one hand on the mounting pin and on the other hand on the profiled accommodating part of the second adapter. A holding frame expediently runs spaced apart from the outer contour of the profiled accommodating part, said holding frame being connected to the side wall of the second adapter and limiting the play between the profiled accommodating part and the third joining element. The profiled accommodating part can advantageously be connected to the side wall via a spring tongue so that the third connecting element is fixed to the side wall of the flap in a play-fee manner.

In an advantageous manner, the profiled accommodating part is a hollow profile, one side of which is open and faces the side wall of the flap. A profiled latching part that runs transversely for accommodating a mounting pin of the fourth joining element, which mounting pin runs transversely to the longitudinal direction of the wiper blade, is located at the inner end of the hollow profile. In the closed state of the flap, an opening in the side wall of the flap aligns with the profiled latching part; thus enabling the mounting pin of the fourth connecting element to be inserted through the opening of the side wall into said profiled latching part.

In the case of the third adapter, a guide block instead of the profiled accommodating part is fastened to the side wall which is located opposite to the side wall of the flap. The guide block provides accommodating options for a fifth, sixth and seventh joining element. To this end, holding tongs, which are open towards the cover wall of the flap and the limbs of which form a gap, are disposed on the outer end of said joining element so as to be spaced apart from the guide block in the region of the bearing bushing. A link plate of the fifth and sixth joining element or a cranked end of the seventh joining element is located between the limbs and is held there by detent cams at the ends of said limbs.

In order to axially fix the fifth joining element, abutment flanges are provided on the edges oriented towards the supporting element on the outsides of the side walls of the guide block. The abutment flanges have in each case a recess comprising a detent-and-abutment cam. Projections on the side walls of the fifth and sixth joining element fit into said recesses. The projections of the fifth joining element have undercuts, which abut on chamfers on the detent-and-abutment cams, whereas projections on the side walls of the sixth joining element without cutouts abut on lay-on surfaces of the detent-and-abutment cams. In this case, a detent cam on the cover wall of the guide block engages in a corresponding opening of the sixth joining element.

The seventh connecting element is fixed to the same detent cam, which engages in a latching hole of the seventh connecting element. The seventh connecting element is guided laterally in that the side walls of the guide block form an overhang so that a lateral guide channel develops between said side walls.

The fifth adapter is used for the articulated connection of a ninth and tenth joining element to the wiper blade. It is similar in design to the first and fourth adapter. For this purpose, a base element of the fifth adapter has a guide block running in the longitudinal direction, which has an interstice that runs transversely, tapers toward the base of the connecting element and into which an open hub of a cover cap having a corresponding outer contour can be inserted. In the closed state, a cover wall of a flap of the base element overlaps the interstice and the hub to some extent. In order to mount the ninth joining element, the cover cap is removed and the profile roller of the tenth joining element is immediately inserted into the corresponding interstice of the guide block, wherein lateral guide cheeks of the ninth joining element are guided along the side walls of the guide block.

In order to mount the tenth joining element, the cover cap is inserted into the interstice of the guide block and the mounting pin is inserted into the open hub of the cover cap. For this purpose, the mounting pin has expediently two flat portions opposite to one another; and therefore the mounting pin can be inserted through an opening which is reduced with respect to the diameter of the open hub and is secured by turning into the operating position. The tenth joining element is secured in the axial direction of the mounting pin by a lock plate provided on the free end of said mounting pin.

Not only the connecting device comprising the connecting element and the adapter including where applicable the cover flap is protected by the claims but also a wiper blade, with which the connecting device is used, and the connecting element as well as the adapters comprising where applicable the cover caps thereof as single elements.

Further advantages result from the following description of the drawings. Exemplary embodiments of the invention are depicted in the drawings. The drawings, the description and the claims contain numerous features in combination. The expert in the field will expediently examine the features individually and will put them together in further useful combinations.

DETAILED DESCRIPTION

Figure 1:
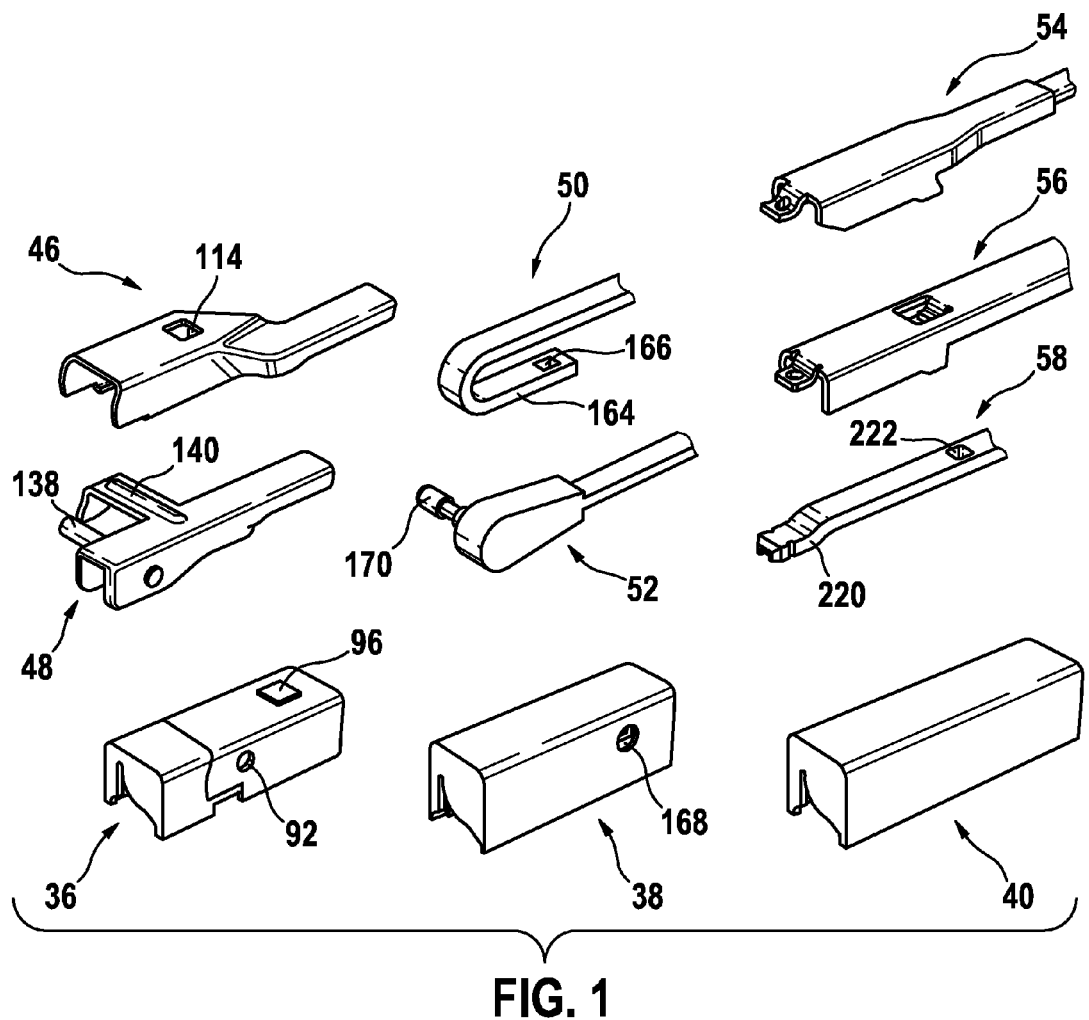
FIG. 1 shows a configuration of three adapters, which with a connecting element form a connecting device according to the invention for seven different joining elements of corresponding wiper arms.

A connecting device 10 according to the invention comprises a connecting element 20 (FIG. 2), which is rigidly connected to a wiper blade 12 and is the same for all embodiments, and depending on the embodiment a first adapter 36, a second adapter 38, a third adapter 40, a fourth adapter 42 or a fifth adapter 44. Common to all of the adapters 36, 38, 40, 42, 44 is that said adapters each have a flap 76, 146 or 252, which has an angular cross-section and forms a part of a cover wall 72, 151, 246 and a side wall 70, 150, 248 of the respective adapters 36, 38, 40, 42, 44. The flaps 76, 146, 252 are connected in an articulated manner to the remaining portion of the adapter 36, 38, 40, 42, 44 by means of integral hinges 84, 148, 260 that run in the longitudinal direction of the adapter 36, 38, 40, 42, 44. A bearing bushing 88, which can be rotatably mounted on a mounting pin 28 of the connecting element 20, is rigidly connected to the end of the adapter 36, 38, 40, 42, 44 which faces the outer end of the wiper blade 12. In the closed state of the flap 76, 146, 252, the bearing bushing 88 is axially fixed on the mounting pin 28 by means of said flap 76, 146, 252.

Figure 13:
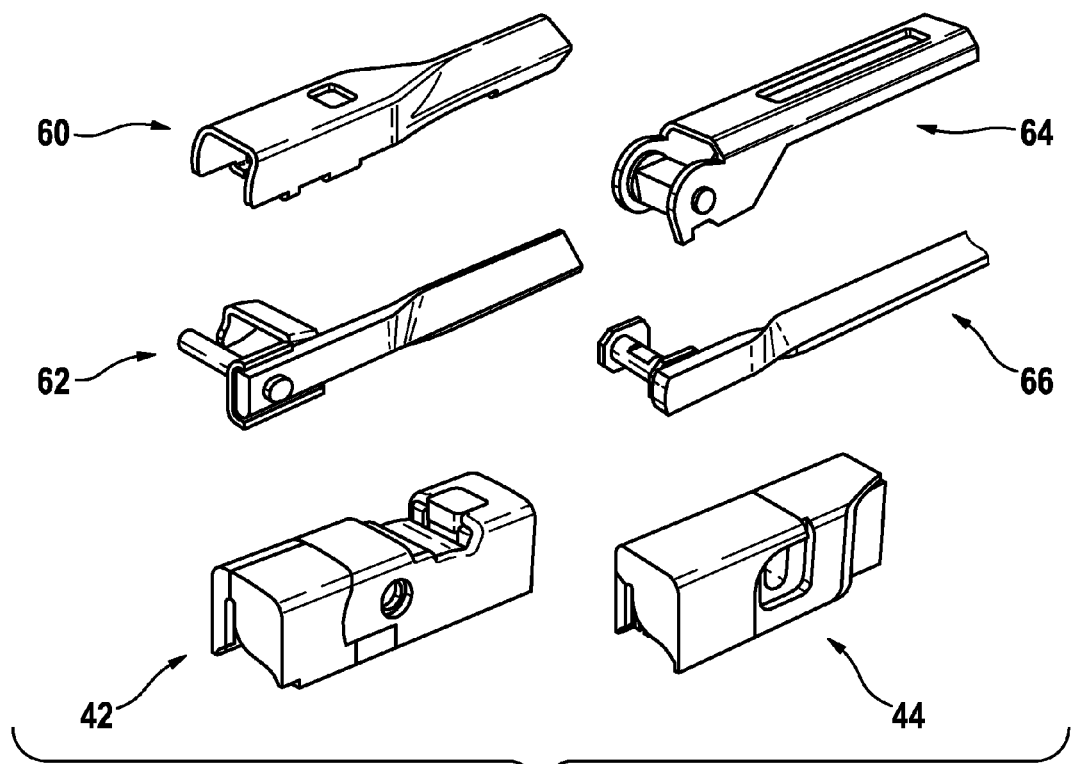
FIG. 13 shows a configuration of two further adapters, which with the connecting element form a connecting device according to the invention for additionally four different joining elements of corresponding wiper arms.
Figure 14:
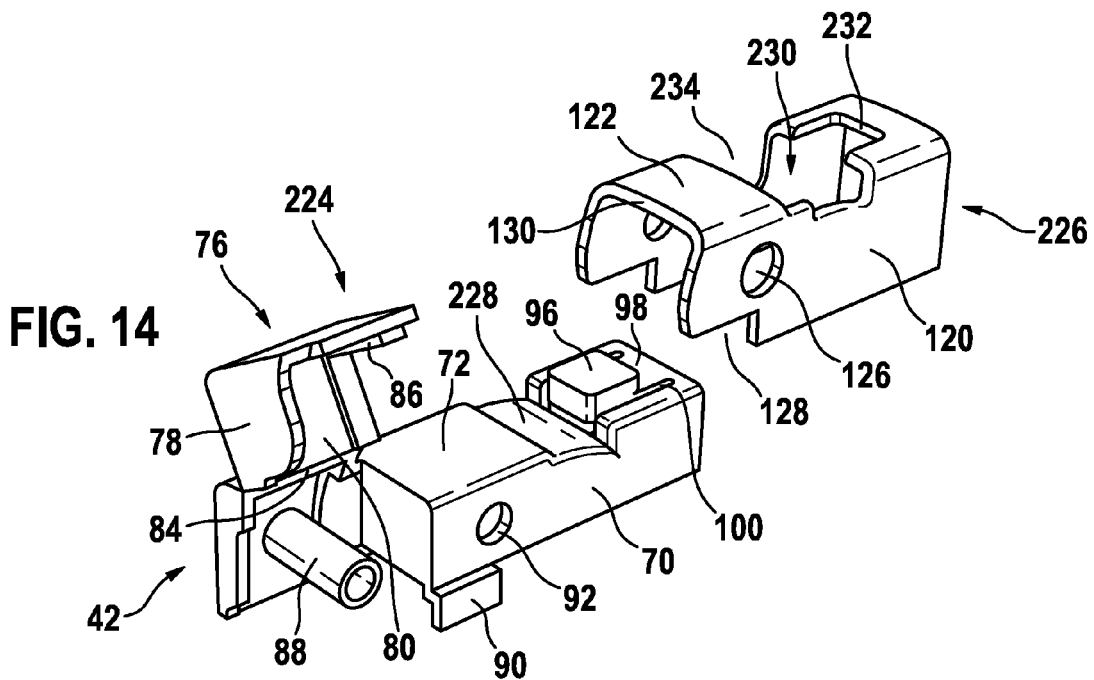
FIG. 14 shows an exploded view of a fourth adapter comprising a cover cap.
Figure 15:
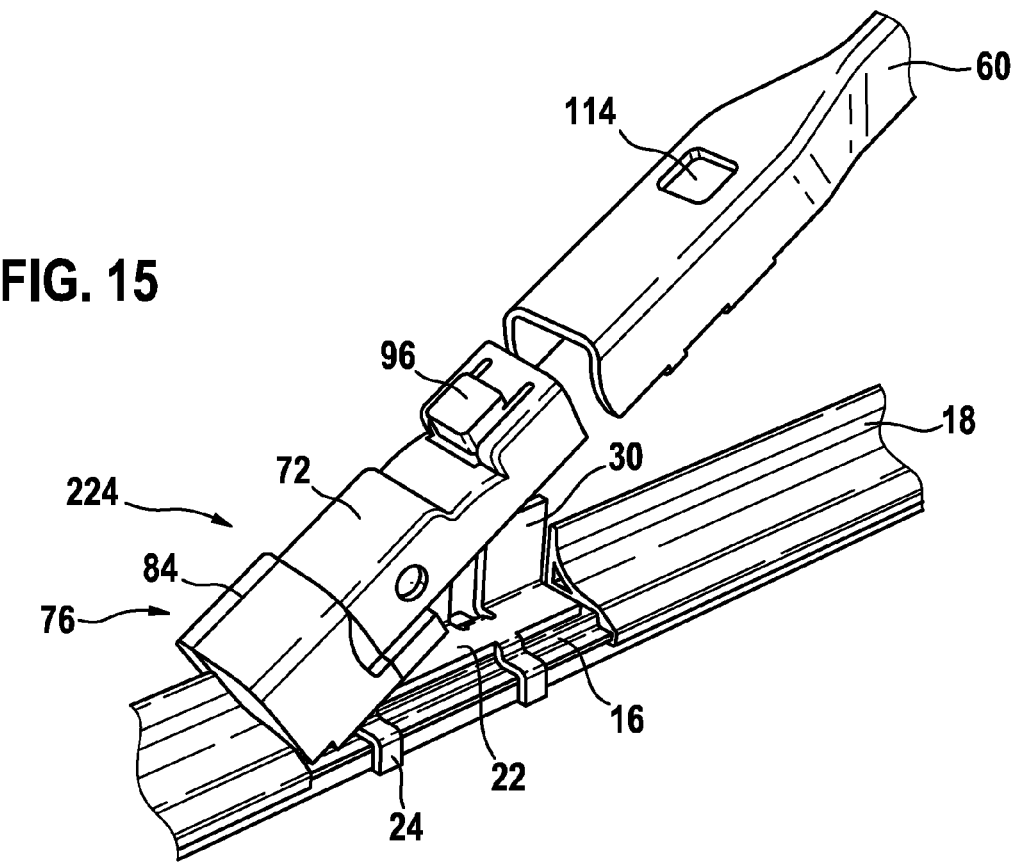
FIG. 15 shows a perspective view of a wiper blade comprising a connecting device having a base element of the fourth adapter during the assembly of an eighth joining element.
Figure 16:
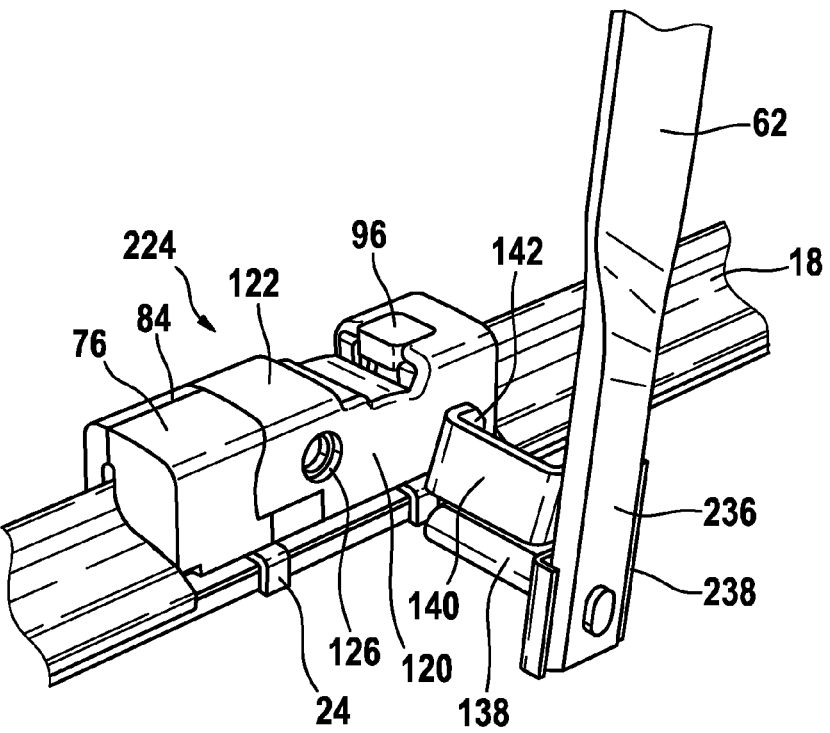
FIG. 16 shows a perspective view of a wiper blade having a connecting device comprising the fourth adapter during the assembly of a ninth joining element.
Figure 17:
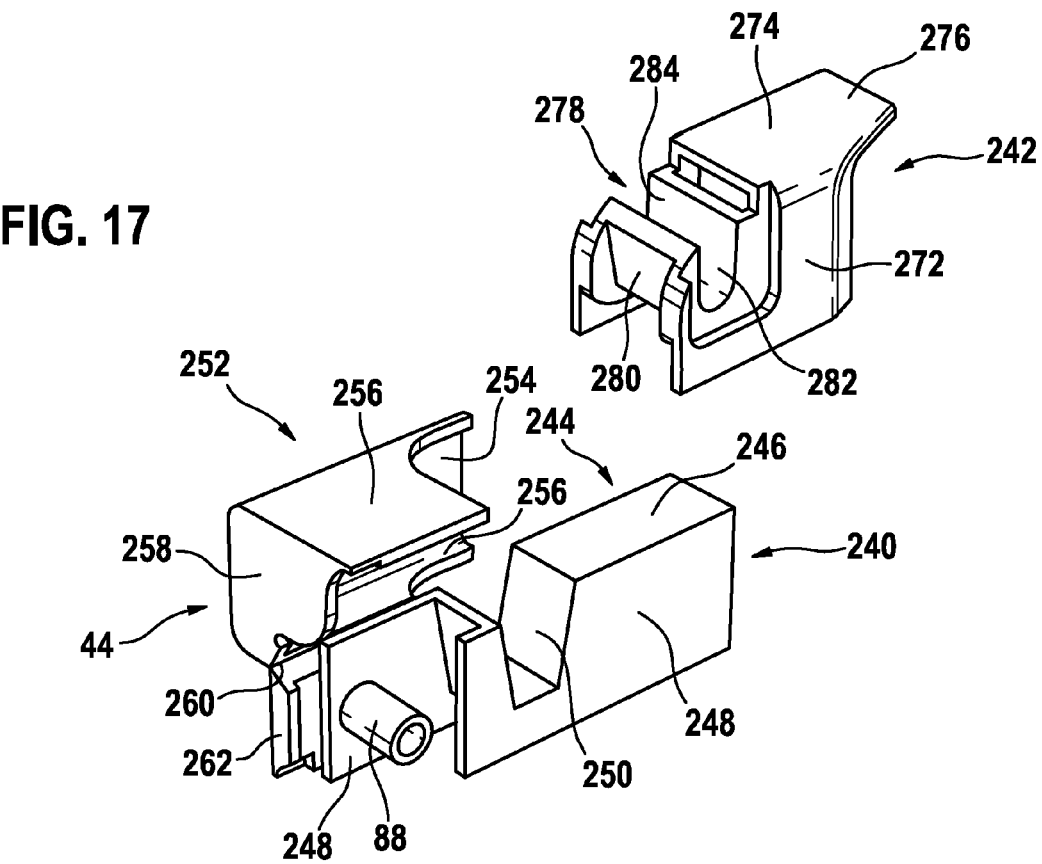
FIG. 17 shows an exploded view of the fifth adapter comprising a cover cap.
Figure 18:
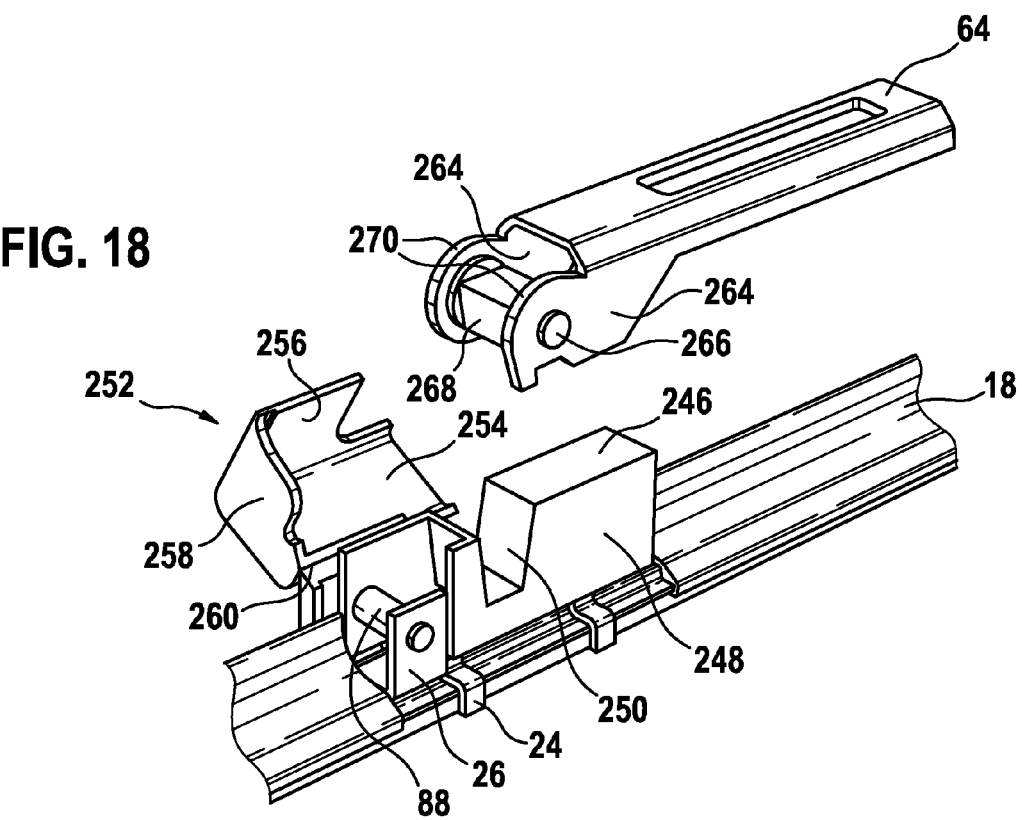
FIG. 18 shows a perspective view of a wiper blade comprising a base element of the fifth adapter during the assembly of a tenth joining element.
Figure 19:
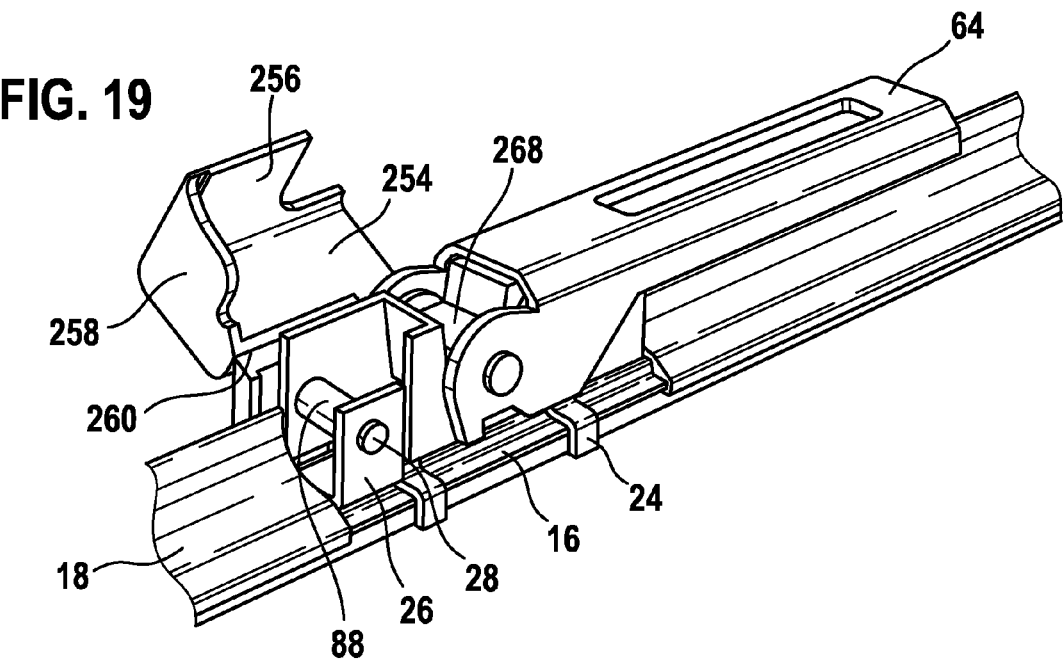
FIG. 19 shows a wiper blade pursuant to FIG. 18 comprising the fitted tenth joining element and FIG. 20 shows a perspective view of a wiper blade comprising the fifth adapter and the associated cover cap during the assembly of a first joining element.
Figure 20:
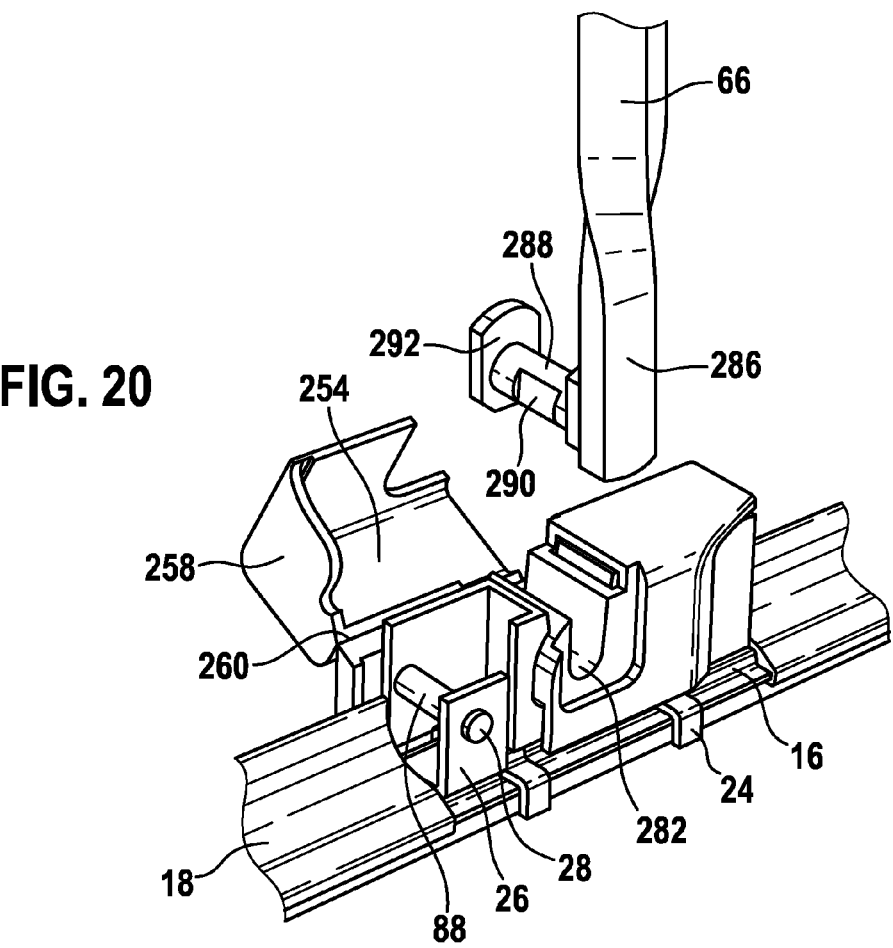

The five adapters 36, 38, 40, 42, 44 differ in the connecting options thereof to eleven different joining elements 46, 48, 50, 52, 54, 56, 58 (cf. FIG. 1), 60, 62, 64, 66 (cf. FIG. 13).

Figure 2:
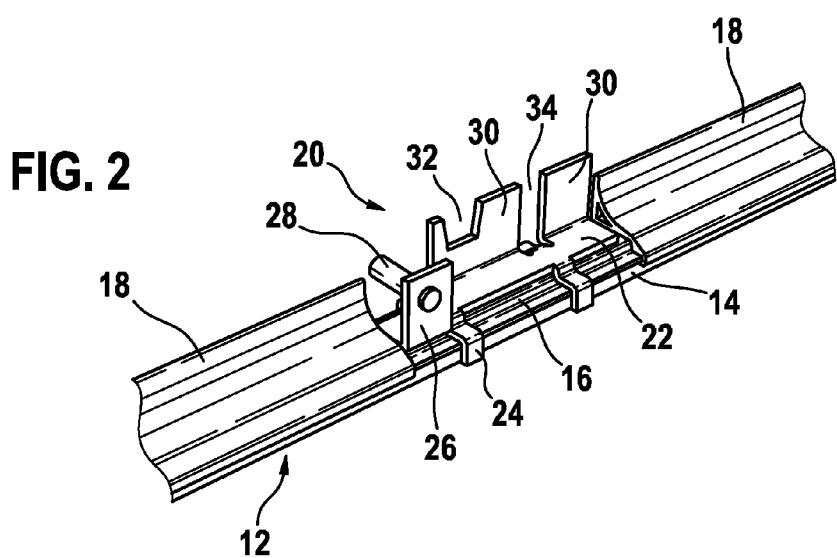
FIG. 2 shows a perspective view of a wiper blade comprising a connecting element of a connecting device according to the invention.
Figure 3:
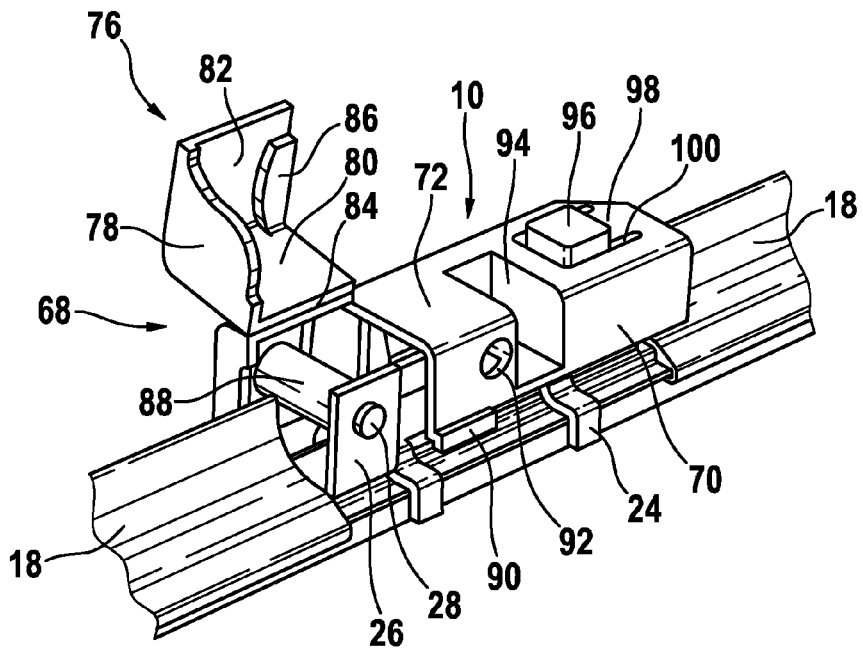
FIG. 3 shows a perspective view of a wiper blade comprising a connecting device having a first adapter.
Figure 4:
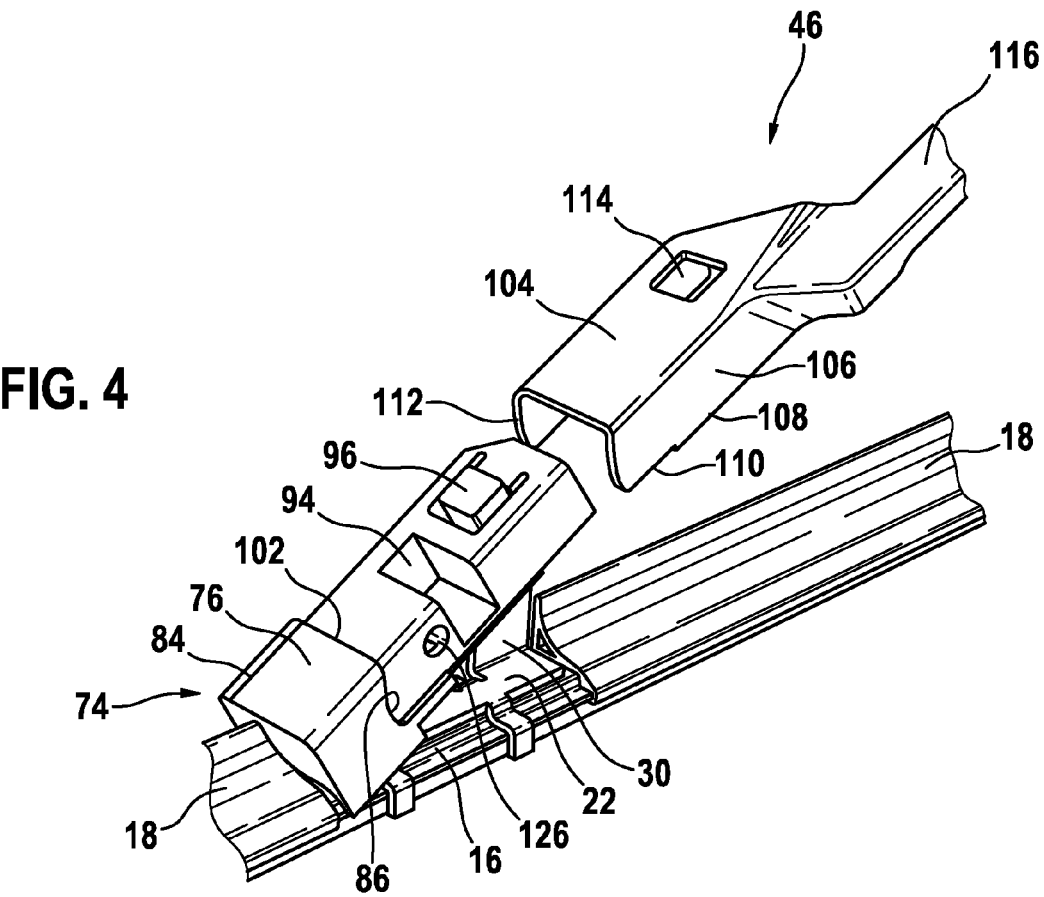
FIG. 4 shows a perspective view of a wiper blade pursuant to FIG. 3 during the assembly of a first joining element.
Figure 5:
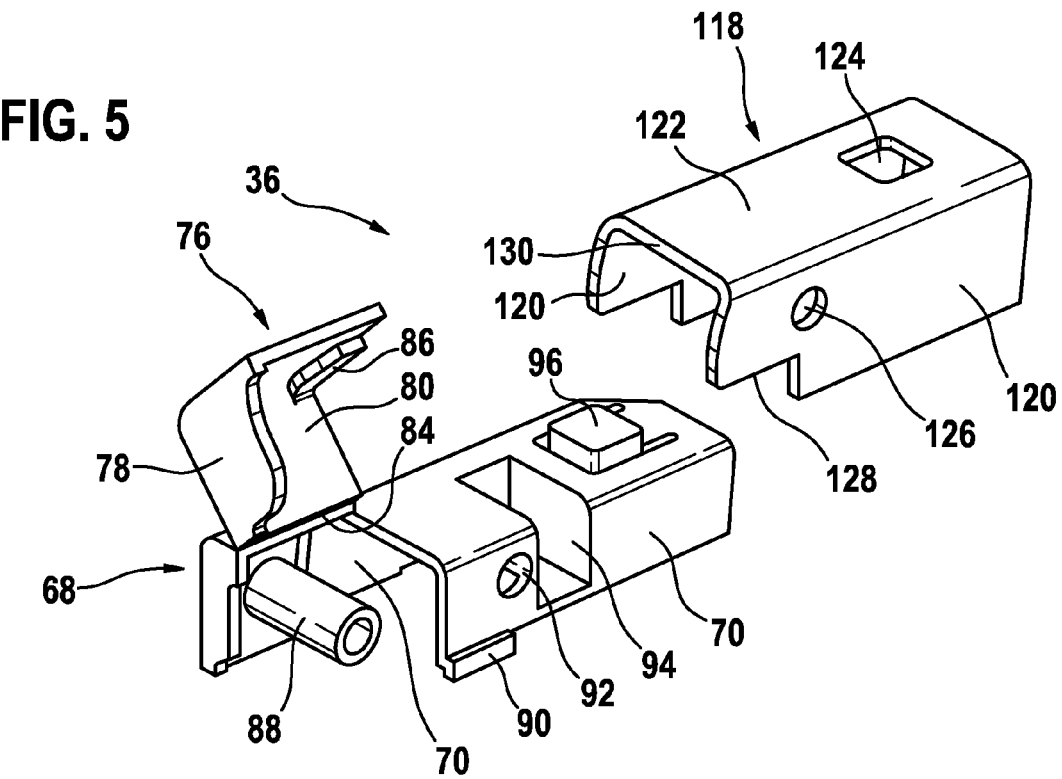
FIG. 5 shows an exploded view of a first adapter comprising a cover cap.
Figure 6:
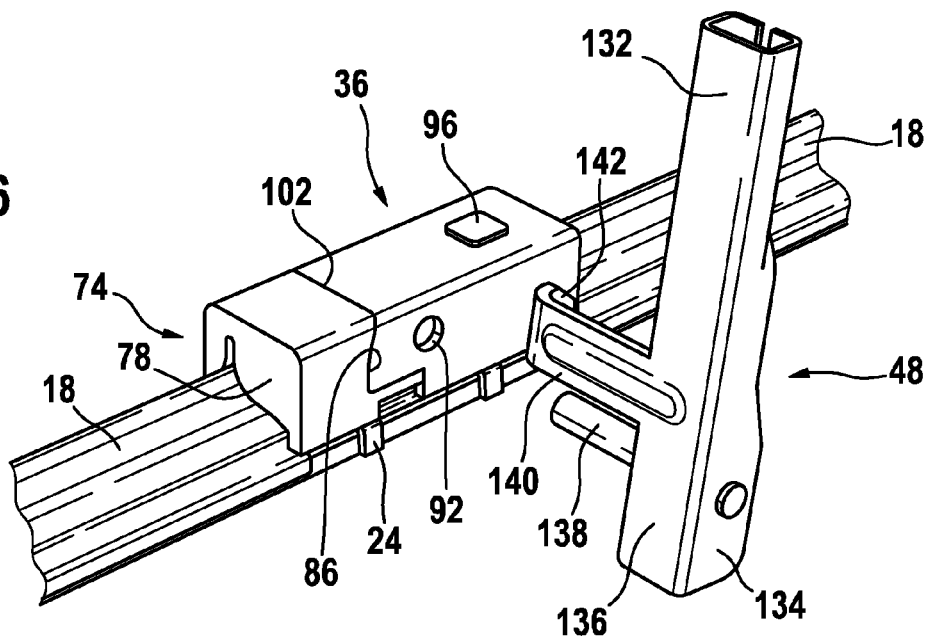
FIG. 6 shows a perspective view of a wiper blade comprising a fitted first adapter having a cover cap during the assembly of a second joining element.
Figure 7:
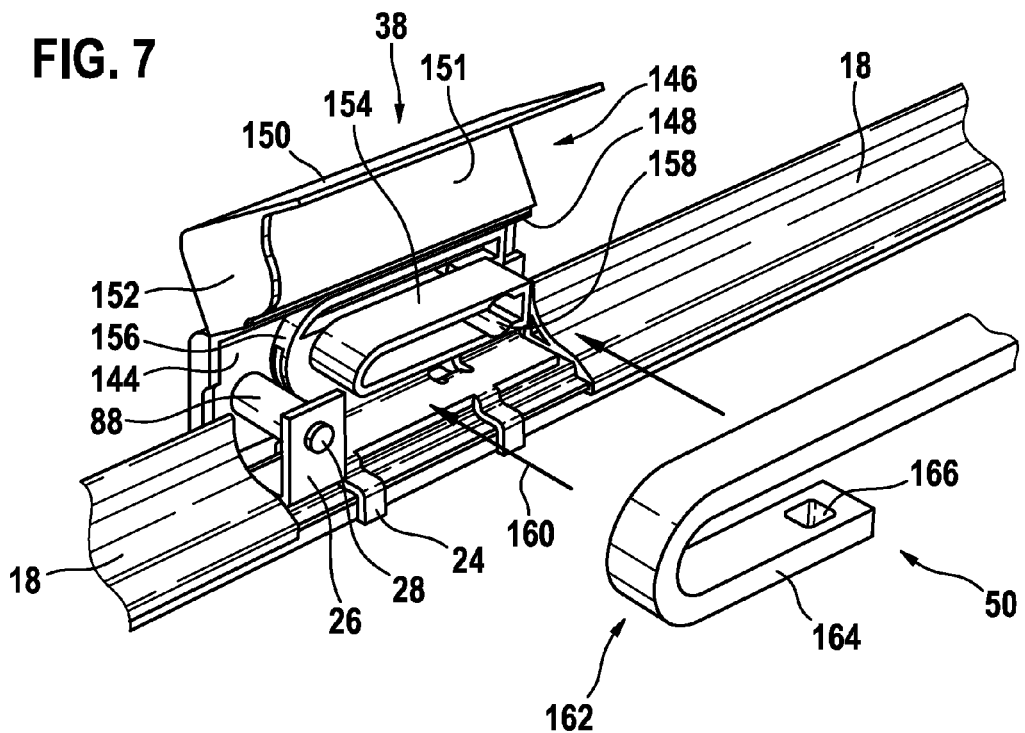
FIG. 7 shows a perspective view of a wiper blade comprising a second adapter during the assembly of a third joining element.
Figure 8:
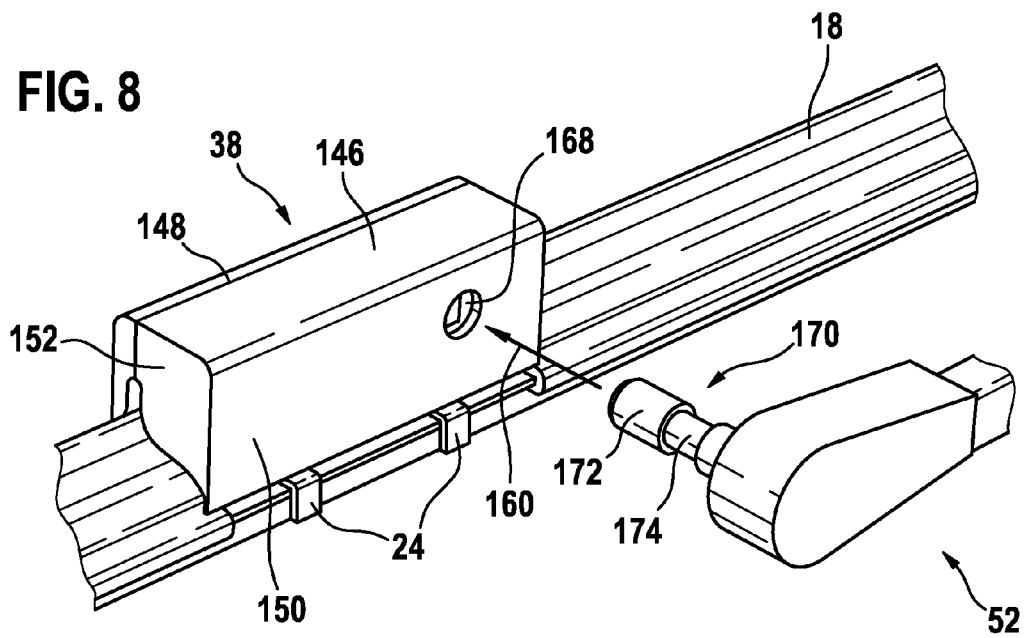
FIG. 8 shows a wiper blade pursuant to FIG. 7 during the assembly of a fourth joining element.
Figure 9:
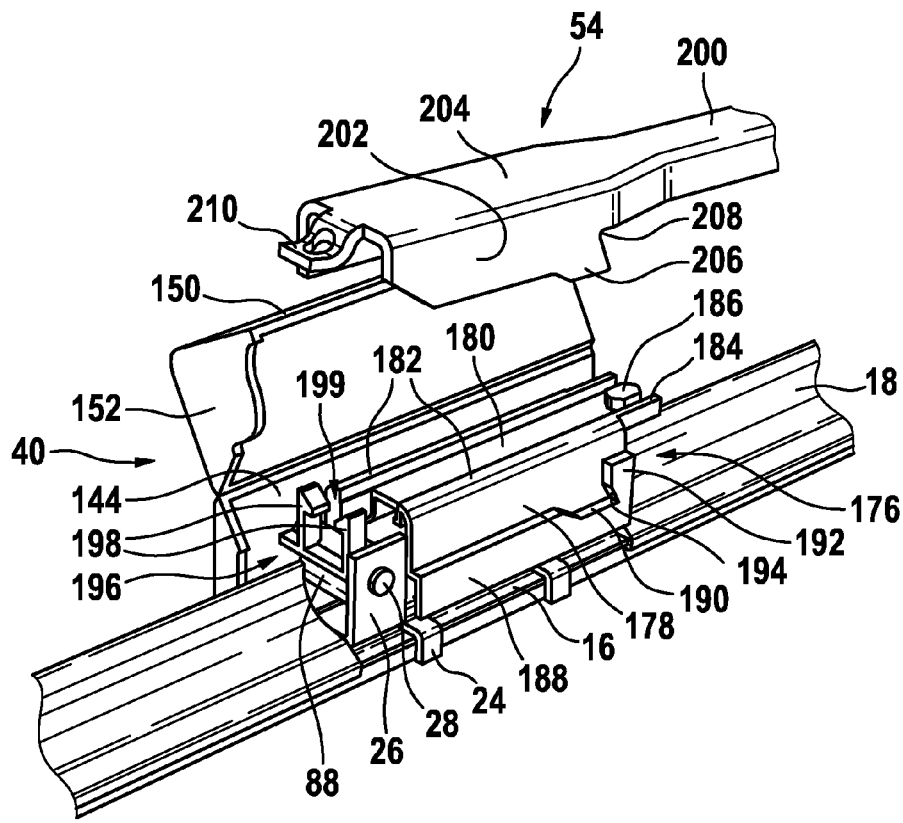
FIG. 9 shows a perspective view of a wiper blade comprising a third adapter during the assembly of a fifth joining element.
Figure 10:
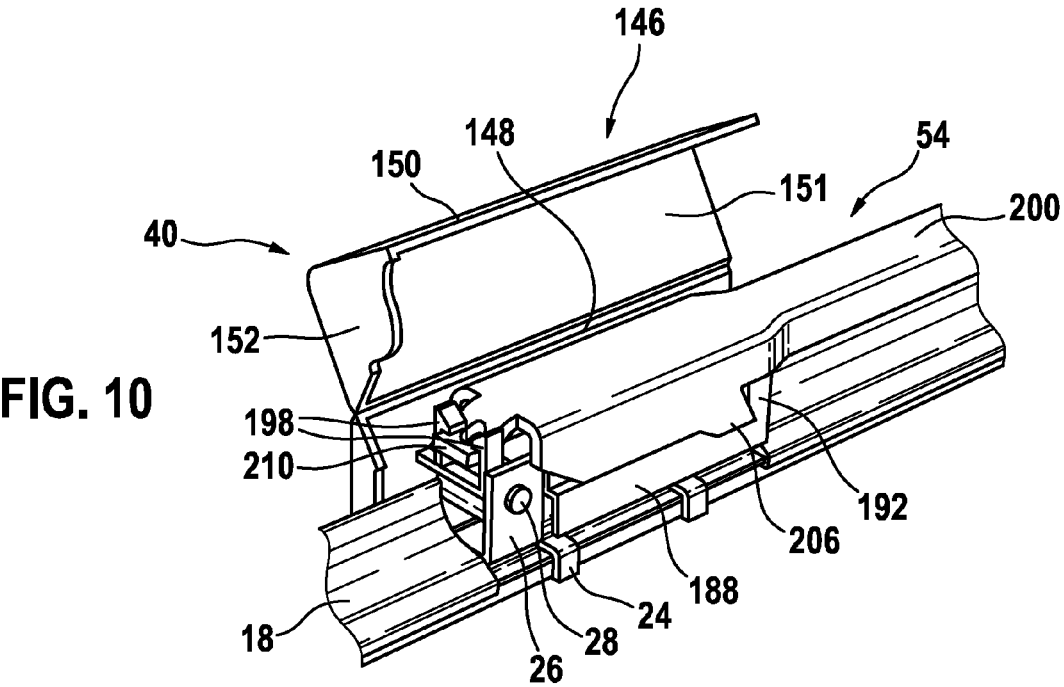
FIG. 10 shows a wiper blade pursuant to FIG. 9 comprising a fitted fifth joining element.
Figure 11:
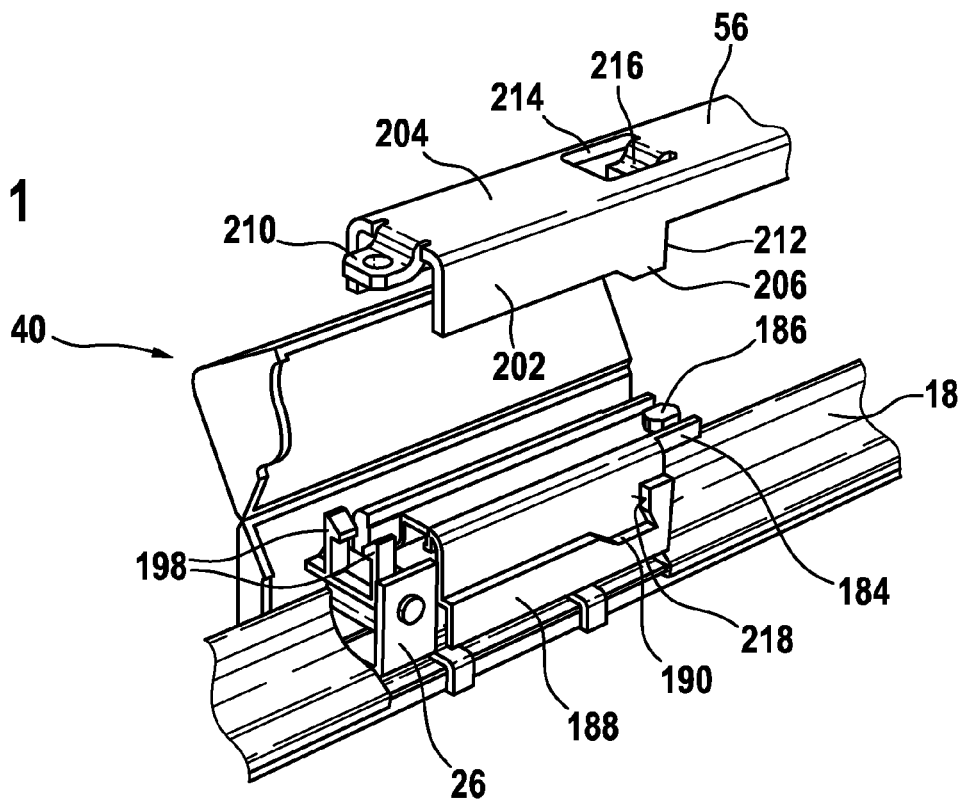
FIG. 11 shows a variant to FIG. 9.
Figure 12:
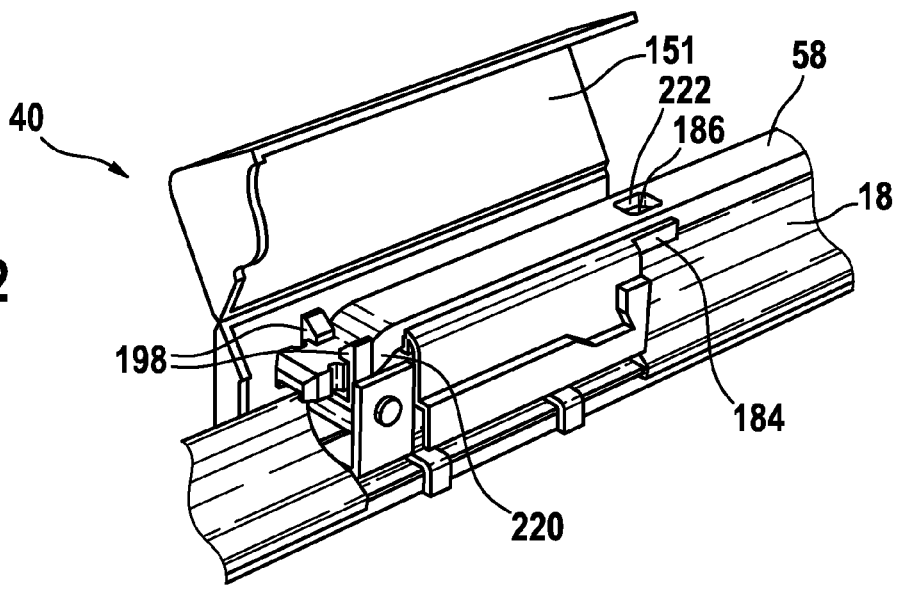
FIG. 12 shows a variant to FIG. 10.

The wiper blade 12 depicted in FIG. 2 has a wiper strip 14, which is held by a supporting element 16 in the form of two flat spring rails consisting of metal or plastic that run parallel to one another. Spoiler parts 18 are mounted on the supporting element 16 on both sides of the connecting element 20, which is fastened by means of claws 24 to said supporting element 16. The connecting element 20 has a base 22 that runs in the longitudinal direction. At the end of the base 22 oriented towards the outer end of the wiper blade 12, a mounting web 26 is angled counter to the claws 24 on one longitudinal edge and supports a mounting pin 28 which is oriented to the other longitudinal edge of said base 22. A lateral web 30 which runs parallel to said mounting web 26 is integrally formed onto the longitudinal edge of said base 22 opposite to the mounting web 26 in an offset manner with respect to the outer end of the wiper blade 12. Said lateral web is divided by a gap 34 that runs transversely to said base 22, wherein a recess 32, which tapers in the direction towards the base 22, is provided in the part that is oriented towards the outer end of the wiper blade 12.

The first adapter 36 has a substantially U-shaped cross-sectional profile, which is formed from two side walls 70 and their connecting cover wall 72. The front part 74 of the first adapter 36, which faces the outer end of the wiper blade 12, is formed in the region of the cover wall 72 and a side wall 70, which lies on the side of the mounting web 26 of the connecting element 20, by the flap 76, the side wall 82 of which forms a part of the side wall 70 and the cover wall 80 of which forms a part of the cover wall 72 of the adapter 36. On the face side, the flap is delimited by an end wall 78, the free edge of which is matched to the profile of the spoiler part 18 and abuts with play on the same so that a pivoting motion of the first adapter 36 about the mounting pin 28 of the connecting element 20 is possible.

The bearing bushing 88, which is pushed onto the mounting pin 28 when the flap 76 is open, is fastened to the inside of the side wall 70 on the side of the adapter 36 opposite to the mounting web 26. The flap 76 is then closed, wherein the side wall 82 of which engages over the mounting web 26 and therefore secures the bearing bushing 88 and the first adapter 36 in the longitudinal direction of the mounting pin 28. The first adapter 36 can now be pivoted about a predefined angle relative to the wiper blade 12 around said mounting pin 28, the inner surface of the side wall 70, to which the bearing bushing 88 is fastened, being laterally guided at the lateral web 30.

The base element 68 of the adapter 36 has an abutment edge 102, which extends across the side walls 70 and the cover wall 72, at the transition between the flap 76 and the rest of the adapter 36. In the region of the side walls 70, the abutment edge 102 forms pockets 86, in which the convex leading edge 112 of the first joining element 46 engages and thereby fixes the flap 76 in the closed state. At the inner end of the wiper blade 12, a bearing opening 92, which is followed by a clearance space 94 spaced apart from said opening, is provided at least in one side wall 70 of the base element 68 in an offset manner with respect to the abutment edge 102. At the inner end of the first adapter 36, a spring tongue 98 is provided in the cover wall 72 thereof, said spring tongue being formed by two longitudinally directed slots 100 and supporting a push button 96 which outwardly protrudes with respect to the cover wall 72.

During assembly, the first joining element 46 is pushed with the front face thereof onto the first adapter 36, wherein the two side walls 106 thereof including their connecting cover wall 104 encompass the side walls 70 and the cover wall 72 of the first adapter 36 and the cover wall 104 pushes the push button 96 back until the latter latches in the end position into a latching hole 114 in the cover wall of the first joining element 46. The joining element 46 has guide webs 108, which engage under the side walls 70 of the first adapter 36, at the longitudinal edge thereof which faces the supporting element 16. The side walls 106 have recesses 110 at the part of the first joining element 46 that is directed towards the outer end of the wiper blade 12. The recesses 110 match to the guide webs 90, which adjoin the abutment edge 102 in the longitudinal direction and serve as stops. The first joining element 46 has in addition a profiled connecting part 116 for a wiper arm, which is not depicted, said profiled connecting part running laterally offset with respect to the first adapter 36. Like all of the other joining elements 48 to 66, the first connecting element 46 can thus be integrally formed on the wiper arm or be rigidly connected to the same as a separate component.

The application options for the first adapter 36 can be expanded by a cover cap 118. Said cover cap can assume at the base element 68 the position of the first joining element 36 by both side walls 120 thereof and their connecting cover wall 122 encompassing the side walls 70 and the cover wall 72 of the base element 68. In so doing, the push button 96 is pushed back during assembly by the cover wall 122 until, in the end position of the cover cap 118, said push button latches into a latching aperture 124 in the cover wall 122 of the cover cap 118. In the end position, a face edge 130 of the cover cap 118, which is convexly designed in the region of the side walls 120, abuts on the corresponding abutment edge 102, whereby the flap 76 is fixed in the closed position thereof. In this position, the guide webs 90 of the base element 68 are situated in recesses 128 of the cover cap 118.

The cover cap 118 has further a bearing opening 126 in at least one side wall 120, said bearing opening 126 aligning with the bearing opening 92 in the side wall 70 of the base element 68. It is thereby possible to mount the second joining element 48 by a mounting pin 138, which is in a position that has been rotated about an angle of approximately 90 degrees with respect to the wiper blade 12, being pushed into the bearing openings 126, 92 and subsequently being pivoted back into the operating position. The second joining element 48 has a profiled connecting part 132 which has a substantially U-shaped cross-sectional profile at the end thereof, said profile being formed by two side walls 134 and their connecting cover wall 136. The mounting pin 138 is riveted to the side walls 134. A bridge 140, the angled end 142 of which grasps and holds the cover cap 118 on the outside of the side wall 120, is integrally formed in an offset manner with respect to the inner end of the second joining element 48.

A flap 146 of the second adapter 38 extends across the entire length thereof. The same is true for an integral hinge 148, with which the flap 146 is connected in an articulated manner to the rest of the second adapter 38. Said flap 146 has an angular cross-section, which is formed by a side wall 150 and at least one part of the cover wall 151. On the face side, said flap is delimited by an end wall 152 which has an edge of the profiled connecting part towards the spoiler part 18. The bearing bushing 88 is integrally formed on the side wall 144 facing away from the mounting web 26. An elongated holding frame 156, which serves to accommodate a third joining element 50 comprising a hook-shaped end, is provided on the same side wall 144. The profiled accommodating part 154 is expediently connected to the side wall 144 via a spring tongue; thus enabling the hook-shaped end 162 to abut in a play-free manner on the side walls 150 and 144 of the second adapter 38. The short limb 164 of the hook-shaped end 162 further comprises a latching hole 166. Said latching hole can together with a latching pin (not shown) of the profiled accommodating part 154 serve to secure the third joining element 50. In addition, a holding frame 156 is integrally formed on the inside of the side wall 144, the former delimiting a longitudinal displacement of the hook-shaped end 162 towards the outer end of the wiper blade 12. The third joining element 50 is pushed in the direction of the arrows 160 onto the profiled accommodating part 154 and subsequently secured by the flap 146, which engages above the mounting web 26 with the side wall 150 thereof in the closed state.

In order to accommodate the fourth joining element 52, the second adapter 36 has a profiled latching part 158, which interacts with the mounting pin 170 of the fourth joining element, at the inner end of the profiled accommodating part 154 that is embodied as a hollow profile. The mounting pin 170 is disposed on the side of the fourth joining element 52 facing the second adapter 38 and is pushed in the direction of the arrow 160 through an opening 168 in the side wall 150 of the flap 146 into the profiled latching part 158. In so doing, an annular groove 174 latches in the profiled latching part 158, wherein a head part 172 can reach up into the gap 34 of the lateral web 30 of the connecting element 20.

A third adapter 40 is of similar construction as the second adapter 38. In this case too, a flap 146 extends across the entire length of the adapter 40 and is connected to the side wall 144 of the adapter 40 via an integral hinge 148. Instead of the profiled accommodating part 154 of the second adapter 38, the third adapter 40 has a guide block 176, the side walls 178 of which are connected to one another by means of a cover wall 180, wherein the side walls 178 form overhangs 182 with respect to the cover wall 180, said overhangs running in the longitudinal direction and forming between themselves a guide channel for the seventh joining element 58.

In front of the guide block 176 spaced apart in the direction towards the outer end of the wiper blade 12, holding tongs 196, which are open to the cover wall 151 of the flap 146, are provided in the region of the bearing bushing 88. The limbs 198 of said holding tongs form between themselves a longitudinally oriented gap and have latching means on the free ends thereof. The fifth joining element 54 has a profiled connecting part 200, which at the free end thereof has a substantially U-shaped cross-section. Said cross-section is formed by two side walls 202 and their connecting cover wall 204. On the face side, the cover wall 204 has an integrally formed, cranked link plate 210 which in the assembled state is fixed between the limbs 198 of the holding tongs 196, wherein the side walls 202 and the cover wall 204 encompass the guide block 176. In so doing, the edges of the side walls 102 facing the supporting element 16 abut on abutment flanges 188 of the side walls 178 of the guide block, while projections 206 on the side walls 202 of the fifth joining element 54 engage in recesses 190 of the abutment flanges 188 and are held by undercuts 208 of the projections 206 on corresponding chamfers 194 of detent cams 192 on the abutment flanges 188.

The sixth joining element 56 is similar to the fifth joining element 54. Instead of the undercuts 208, the projections 206 of the side walls 202 have approximately right-angled stop edges 212, which interact with stop surfaces 218 on the detent cams 192. In addition, the cover wall 204 of the sixth joining element 56 has an opening 214 comprising a link plate 216 oriented towards the outer end. The opening 214 interacts with the latching hole 186, wherein the link plate 216 engages below the edge of the detent cam 186 facing it.

The seventh joining element 58 forms the end of a wiper rod. Said joining element has a cranked end 220 and a latching hole 222 which is offset with respect to the inner end thereof. In the assembled state, the cranked end 220 is held by the holding tongs 196, while the detent cam 185 latches in the latching hole 222. The detent cam 186 lies in the region of a projection 184 of the cover wall 180 of the guide block 176.

The fourth adapter 42 is similar in design to the first adapter 36. Said fourth adapter serves to connect the eighth and ninth joining element 60 and respectively 62. Said joining elements have similarities to the first joining element 46 and the second joining element 48. In contrast to the first joining element 46, the profiled connecting part 116 of which runs to the wiper arm in a laterally offset manner with respect to the wiper blade 12, the eighth joining element 60 runs in the direction of the wiper blade 12. In addition, the ninth joining element 62 is manufactured from a wiper rod, which has a twisted end 236, a broadside of the rod thereby facing the fourth adapter 42. Said broadside is encompassed by a shoe 238, on which a bridge 140 comprising an angled end 142 is integrally formed. The shoe 238 is riveted to the twisted end 236 by a mounting pin 138 running substantially parallel to the bridge 140, said mounting pin running in an offset manner with respect to the free end of the ninth joining element 62.

In order to mount the eighth joining element 60, only the base element 224 of the fourth adapter 42 is required. The base element 224 has in contrast to the base element 68 of the first adapter 36 a depression 228 which runs transversely towards the outer end and lies behind the push button 96. Said depression first becomes relevant when mounting the ninth joining element 62. The eighth joining element 60 is pushed with the front face thereof onto the base element 224 until the push button, which initially is pushed back, snaps into the latching hole 114 of the eighth joining element 60. The assembly procedure is otherwise just as in the case of the first joining element 46.

When mounting the ninth joining element 62, a cover cap 226 takes the place of the eighth joining element 60. Said cover cap has a substantially U-shaped cross-sectional profile, which is formed by two side walls 120 and their connecting cover wall 122. A bearing opening 126 is situated at least in one side wall 120, the former aligning with a bearing opening 92 in the side walls 70 of the base element 224 in the assembled state.

A transversely running opening 230, which extends up into the region of the side walls 120, is situated in the cover wall 122. At the inner end of the fourth adapter 42, the opening 230 enlarges due to an opening part 232 for the push button 96 of the base element 224. The ninth joining element 62 is pushed into the bearing openings 126, 92 in a position which is rotated about an angle of approximately 90 degrees in the direction of the mounting pin 138 and is subsequently rotated back into the operating position. The bridge 140 dips thereby through the opening 230 into the depression 228 of the base element, wherein the angled end 142 of the bridge 140 abuts on the outside of the associated side wall 70 of the base element 224 so that a pivoting motion takes place exclusively between the bearing bushing 88 and the mounting pin 28.

The fifth adapter 44 has a base element 240 comprising a guide block 244 which extends in the longitudinal direction and has a substantially U-shaped cross-section. This cross-section is formed by two side walls 248, which are connected to one another by a cover wall 246. In the outer region, the cover wall 246 and the side wall 248 are formed by a flap 252 which comprises a side wall 256 and a cover wall 254 as well as an end wall 258. The cover wall 254 is connected to a housing part 262 of the fifth adapter 44 via an integral hinge 260. An interstice 250, the flat walls of which draw nearer to each other in the direction of the supporting element 16, is provided in the guide block 244 opposite to the bearing bushing 88 in an offset manner with respect to the inner end. A profile roller 268 fits into said interstice 250, the axis 266 of the former being riveted to guide cheeks 264 of the ninth joining element 62. The guide cheeks 264 form protruding edges 270 in the region of the profile roller 268. During assembly, said profile roller 268 is inserted into said interstice 250 and held there in a rotationally fixed manner. By closing the flap 252, the fifth adapter with the bearing bushing thereof is on the one hand axially fixed on the mounting pin 28; and on the other hand, the profile roller 268 is held in said interstice 250 by means of the cover wall 254 which extends to the inner end of the wiper blade 12.

In order to mount the eleventh joining element 66, a cover cap 242 is inserted into the fifth adapter 44. The cover cap 242 has two side walls 272, which are connected to one another by means of a cover wall 274 and an open hub 278. The open hub 278 lies at the outer end of the cover cap 242, whereas the cover wall 274 has an extension 276 on the opposite end of said cover cap in order to improve handling.

The open hub 278 has an outer contour 280 which corresponds to the interstice 250; thus enabling said hub to be mounted in the interstice 250 of the guide block 244 in the same manner as the tenth joining element 64. The eleventh joining element 66 is mounted before the flap 252 is closed. Said eleventh joining element is manufactured from a wiper rod and has a twisted end 286, whereat a broadside faces towards the fifth adapter. A mounting pin 288 is mounted on said broadside of the joining element, which mounting pin has a lock plate 292 on the free end thereof, said lock plate axially securing the mounting pin 288 in the open hub 278. Said mounting pin 288 has flat portions 290 on opposite sides; thus enabling said pin at an appropriate amount of rotation to be pushed through an open gap 284 in the open hub 278, wherein the gap 284 is narrower than the diameter of the cylindrical part 282 of the open hub 278. By turning the eleventh joining element 66 into the operating position, the mounting pin 288 is locked in the open hub 278. The flap 252 is then closed, the cover wall 254 overlapping the open hub 278 to some extent.

The invention claimed is:

1. A connecting device (10) for connecting a joining element (46, 48, 50, 52, 54, 56, 58, 60, 62, 64, 66) of a wiper arm to a wiper blade (12) in an articulated manner, a supporting element (16) of said wiper blade being rigidly connected to a connecting element (20) of the connecting device (10), wherein the connecting element (20) has at least one mounting web (26) which runs in a longitudinal direction, protrudes into an interior of at least one type of adapter (36, 38, 40, 42, 44) and supports a mounting pin (28) that runs transversely to the longitudinal direction, the at least one type of adapter (36, 38, 40, 42, 44) being pivotably mounted on said mounting pin by mounting means (88), wherein the at least one type of adapter (36, 38, 40, 42, 44) is detachably connected to the joining element (46, 48, 50, 52, 54, 56, 58, 60, 62, 64, 66), characterized in that the mounting web (26) is integrally formed on one longitudinal edge of a base (22) of the connecting element (20) only in a short region on an outer end of the connecting element (20) and the mounting pin (28) is secured on the mounting web (26) in a cantilevered manner towards an other longitudinal edge of the base (22), while a lateral web (30) is integrally formed on the other longitudinal edge of the base (22) in an offset manner with respect to the outer end of the connecting element (20).

2. The connecting device (10) according to claim 1, characterized in that the lateral web (30) is divided by a gap (34) which runs perpendicularly to the supporting element (16).

3. The connecting device (10) according to claim 2, characterized in that the lateral web (30) has a recess (32) in a part thereof which is oriented towards an outer end of the wiper blade (12).

4. The connecting device (10) according to claim 1, characterized in that the mounting means includes a bearing bushing (88), which can be rotatably mounted on the mounting pin (28) and is covered by a flap (76, 146, 152) that is angular in cross-section, and which is rigidly connected to an end of the at least one type of adapter (36, 38, 40, 42, 44) which is oriented towards the outer end of the wiper blade, wherein said flap is connected via an integral hinge (84, 148, 260), which runs in the longitudinal direction of said at least one type of adapter (36, 38, 40, 42, 44), to the rest of the at least one type of adapter (36, 38, 40, 42, 44) in an articulated manner and axially secures the bearing bushing (88) on the mounting pin (28) in a closed state.

5. The connecting device (10) according to claim 4, characterized in that the flap (76) only covers a region of the mounting web (26) and the bearing bushing (88) and in that an outwardly protruding abutment edge (102) is provided at a transition of the flap (76) to a remaining part of a base element (68, 224) of at least two types of adapter.

6. The connecting device (10) according to claim 5, characterized in that the abutment edge (102) has pockets (86) on side walls (70) thereof.

7. The connecting device (10) according to claim 5, characterized in that the base element (68, 224) has a spring tongue (98) comprising a push button (96) at an inner end thereof in a cover wall (72) thereof, said push button outwardly protruding with respect to the cover wall (72).

8. The connecting device (10) according to claim 5, characterized in that the base element (68, 224) of the at least two types of adapter has guide webs (90), which run in the longitudinal direction and extend towards the outer end up to the abutment edge (102), on lower edges of the side walls (70) thereof.

9. The connecting device (10) according to claim 5, characterized in that the base element (68, 224) of the at least two types of adapter has a cover cap (118, 226), which with side walls (120) thereof and a cover wall (122) connecting said side walls encompasses the base element (68), wherein a latching opening (124) that matches to a push button (96) or an opening (230) that runs transversely is provided in the cover wall (122), said transversely running opening in addition to the cover wall (122) partially embracing the side walls (120) and comprising an opening part (232), which matches to the push button (96), in the cover wall (122) towards an inner end of the wiper blade (12).

10. The connecting device (10) according to claim 9, characterized in that a bearing opening (126), which aligns with a bearing opening (92) in a side wall (70) of the base element (68, 224), is provided at least in one side wall (120) of the cover cap (118, 226).

11. The connecting device (10) according to claim 4, characterized in that a flap (146) of at least two types of adapter extends across the entire length of the at least two types of adapter.

12. The connecting device (10) according to claim 11, characterized in that an elongate, profiled accommodating part (154) for accommodating a third hook-shaped joining element (50) is provided on a side wall (144) of one of the at least two types of adapter, on which side wall the bearing bushing (88) is integrally formed.

13. The connecting device (10) according to claim 12, characterized in that the profiled accommodating part (154) has a hollow space which on an inner end thereof comprises a transversely running, profiled latching part (158) for accommodating a mounting pin (170) of a fourth joining element (52).

14. The connecting device (10) according to claim 12, characterized in that an opening (168) is provided in a side wall (150) of the flap (146) of the one of the at least two types of adapter, said opening aligning with a profiled latching part (158) in a closed state of the flap (146).

15. The connecting device (10) according to claim 12, characterized in that the profiled accommodating part (154) is connected to the side wall (144) via a spring tongue.

16. The connecting device (10) according to claim 15, characterized in that a holding frame (156), which is connected to the side wall (144) of the one of the at least two types of adapter, runs spaced apart from an outer contour of the profiled accommodating part (154).

17. The connecting device (10) according to claim 11, characterized in that a guide block (176) is connected to an inside of a side wall (144) of one of the at least two types of adapter, said guide block forming a substantially U-shaped cross-sectional profile with two side walls (178) thereof and a connecting cover wall (180), wherein holding tongs (196) comprising two limbs (198) are provided at a slight distance to the guide block (176) in a region of the bearing bushing (88), said limbs forming between themselves a gap (199) that runs longitudinally and is oriented towards the cover wall (151) of the flap (146).

18. The connecting device (10) according to claim 17, characterized in that abutment flanges (188) are provided on outsides of the side walls (178) of the guide block (176) on edges oriented towards the connecting element (20), said abutment flanges having in each case a recess (190) comprising a detent-and- abutment cam (192) in a region of an end thereof that is oriented towards an inner end of the wiper blade (12).

19. The connecting device (10) according to claim 17, characterized in that the side walls (178) of the guide block (176) have overhangs (182) with respect to the cover wall (180), said overhangs forming a longitudinal guide channel between themselves, on an inner end of which a detent cam (186) is disposed.

20. The connecting device (10) according to claim 4, characterized in that a base element (240) of the at least one type of adapter (44) comprises a guide block (244), which runs in the longitudinal direction and has an interstice (250) that runs transversely and tapers towards the base (22) of the connecting element (20), in which interstice an open hub (278) of a cover cap (242) having a corresponding outer contour (280) can be inserted, wherein a cover wall (254) of a flap (252) of the base element (240) overlaps the interstice (250) and the hub (278) to some extent in the closed state.

21. The connecting device (10) according to claim 20, characterized in that the outer contour (280) of the open hub (278) in the region of the interstice (250) is the same as an outer contour of a profile roller (268) of a tenth connecting element (64).

22. A wiper blade (12) having a longitudinal direction and comprising a connecting element (20) which has a mounting web (26) on one longitudinal edge of a base (22) thereof only in a short region on an outer end thereof, on which mounting web a mounting pin (28) is secured in cantilevered manner towards an other longitudinal edge of the base (22), while a lateral web (30) is integrally formed on the other longitudinal edge of the base (22) in an offset manner with respect to the outer end of the connecting element (20), such that the mounting web and the lateral web do not overlap in the longitudinal direction.

23. The wiper blade according to claim 22, wherein the lateral web is divided by a gap (34) that runs transversely to said base (22), wherein the gap divides the lateral web into an inner portion closest to the inner end of the connecting element and an outer portion closest to the outer end of the connecting element.

24. The wiper blade according to claim 23, wherein the outer portion has therein a recess (32), which tapers towards the base (22).

\* \* \* \* \*